US007889682B2

(12) United States Patent
Rouyer et al.

(10) Patent No.: US 7,889,682 B2
(45) Date of Patent: Feb. 15, 2011

(54) DETERMINISTIC OPERATION OF RAPID SPANNING TREE PROTOCOLS FOR PROPER PROPAGATION OF A "CUT"

(75) Inventors: Jessy Rouyer, Fort Worth, TX (US); Laurence Rose, Oak Park, CA (US); Nalinakshan Kunnath, Calabasas, CA (US)

(73) Assignee: Alcatel Lucent, Paris (FR)

( * ) Notice: Subject to any disclaimer, the term of this patent is extended or adjusted under 35 U.S.C. 154(b) by 1220 days.

(21) Appl. No.: 11/389,700

(22) Filed: Mar. 27, 2006

(65) Prior Publication Data

US 2007/0226485 A1 Sep. 27, 2007

(51) Int. Cl.
*H04L 12/28* (2006.01)
(52) U.S. Cl. ..................................... 370/256
(58) Field of Classification Search ................. 370/256, 370/254, 255
See application file for complete search history.

(56) References Cited

U.S. PATENT DOCUMENTS

| | | | |
|---|---|---|---|
| 6,262,977 B1 * | 7/2001 | Seaman et al. .............. 370/256 |
| 6,330,229 B1 * | 12/2001 | Jain et al. ................... 370/256 |
| 6,771,610 B1 | 8/2004 | Seaman |
| 7,324,461 B2 * | 1/2008 | Rouyer et al. ............... 370/254 |
| 2003/0065546 A1 * | 4/2003 | Gorur et al. .................. 705/9 |

OTHER PUBLICATIONS

IEEE P802.1Q-REV/D5.0 Draft Standard for Local and Metropolitan Area Networks Virtual Bridged Local Area Networks-Revision Sep. 12, 2005.*

IEEE Std. 802.1D-2004 "IEEE Standard for Local and Metropolitan Area Networks—Media Access Control (MAC) Bridges", pp. 137-179, copyrighted 2004.
IEEE Std. 802.1Q-REV/D5.0 "IEEE Standard for Local and Metropolitan Area Networks—Virtual Bridged Local Area Networks", pp. 149-205, copyrighted 2005.
IEEE P802.1Q-2004, IEEE Standard for Virtual Bridged Local Area Networks: Revision IEEE [Online ]Sep. 21, 2004, pp. 143-222, XP002446867. Retrieved from the Internet: URL:http://www.ieee802.org/1/files/public/docs2005/qrev-rouyer-mstp-cmp-0105.pdf> [retrieved on Aug. 15, 2007].
Cinkler T et al. "Optimized QoS Protection of Ethernet Trees" Design of Reliable Communication Networks, 2005 (DRCN 2005), Proceedings 5th International Workshop on Island of Ischia, Italy Oct. 16-19, 2005, Piscataway, NJ, USA, IEEE, Oct. 16, 2005, pp. 337-344, XP010868579.
PCT Search Report for PCT Patent Application No. PCT/US2007/064915 dated Aug. 27, 2007.

* cited by examiner

*Primary Examiner*—Daniel Wu
*Assistant Examiner*—Frederick Ott
(74) *Attorney, Agent, or Firm*—Capitol Patent & Trademark Law Firm, PLLC

(57) ABSTRACT

A bridge (e.g., IEEE 802.1 bridge) and a method are described herein which ensure the proper propagation of a "cut" within a bridged network (e.g., Ethernet-based bridged network). In one embodiment, the bridge has a port role transitions (PRT) state machine which uses a first condition represented as (proposed && !agree) to transit to an X_PROPOSED state and a second condition represented as (! proposed && allSynced && !agree) || (proposed && agree) to transit to an X_AGREED state (where X represents "ROOT", "ALTERNATE" and "MASTER"). The first condition and the second condition are both defined such that the X_PROPOSED state is always entered before the X_AGREED state which ensures the proper propagation of a "cut" within the bridged network.

24 Claims, 8 Drawing Sheets

US 7,889,682 B2

DETERMINISTIC OPERATION OF RAPID SPANNING TREE PROTOCOLS FOR PROPER PROPAGATION OF A "CUT"

TECHNICAL FIELD

The present invention is related to a bridge and method for ensuring the proper propagation of a cut within a bridged network (e.g., Ethernet-based bridged network).

BACKGROUND

Today it is possible for an individual/group to make suggested change(s), deletion(s) and/or addition(s) to a networking standard. For instance, the individual/group could request that a change be made to a particular feature in order to enhance the networking standard. One such change that can enhance a spanning tree protocol which is specified in several networking standards happens to be the subject of the present invention.

BRIEF DESCRIPTION OF THE INVENTION

A bridge (e.g., IEEE 802.1 bridge) and a method are described herein which ensure the proper propagation of a "cut" within a bridged network (e.g., Ethernet-based bridged network). In one embodiment, the bridge has a port role transitions (PRT) state machine which uses a first condition represented as (proposed && !agree) to transit to an X_PROPOSED state and a second condition represented as (!proposed && allSynced && !agree) || (proposed && agree) to transit to an X_AGREED state (where X represents "ROOT", "ALTERNATE" and "MASTER"). The first condition and the second condition are both defined such that the X_PROPOSED state is always entered before the X_AGREED state which ensures the proper propagation of a "cut" within the bridged network.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

The present solution basically ensures the proper propagation of a "cut" within a bridged network (e.g., Ethernet-based bridged network) where data loops are prevented by the operation of a spanning tree protocol, such as the ones specified and standardized by the IEEE 802.1 Working Group. These spanning tree protocols include the Rapid Spanning Tree Protocol (RSTP, as specified and standardized in IEEE Std. 802.1D-2004), the Multiple Spanning Tree Protocol (MSTP, as specified and standardized in IEEE Std. 802.1Q-2005) as well as any other protocol built on and/or expanding the use and scope of the RSTP and/or the MSTP. The contents of these standards are incorporated by reference herein.

Figure 1A:
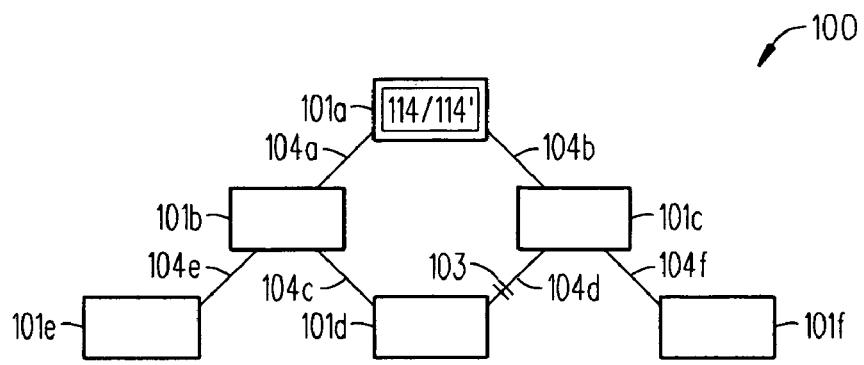
FIG. 1A-1E are diagrams which are used to help explain the propagation of a "cut" which is a mechanism that is initiated to temporarily prevent data from being communicated over parts of a bridged network when, for example, a bridge is added/removed to/from the bridged network FIG. 2 (PRIOR ART) is a block diagram that illustrates the traditional root port role transitions (specified in IEEE Std 802.1D-2004 and IEEE Std 802.1Q-2005) which are implemented within a PRT state machine of a bridge.
Figure 1B:
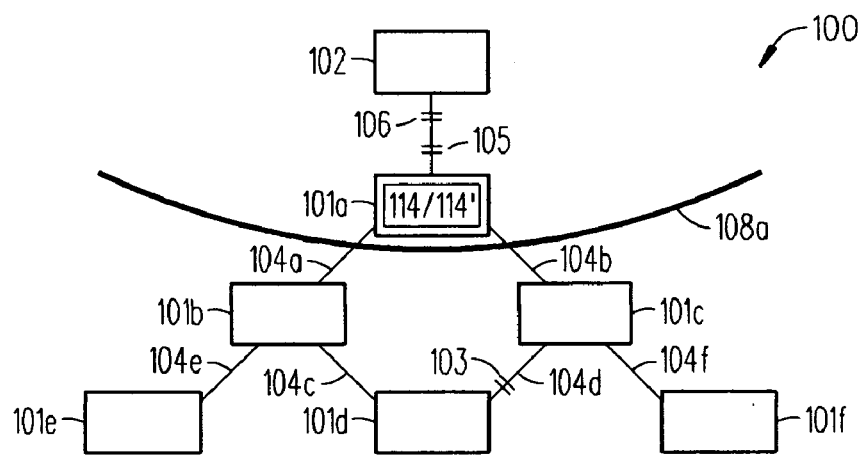

FIG. 1A-1E are diagrams which are used to help explain the propagation of the "cut" which is a mechanism that is initiated to temporarily prevent data from being communicated over parts of the bridged network 100 when, for example, a bridge 102 is added to an exemplary bridged network 100. In FIG. 1A, the bridged network 100 is shown having six bridges 101a, 101b . . . 101f which are interconnected to one another by six links 104a, 104b . . . 104f. The bridged network 100 is loop-free because bridge 101d has a discarding port 103. Now, assume the new bridge 102 is added to the bridged network 100. At this point, the "cut" is initiated by having bridges 101a and 102 set their respective downstream ports 105 and 106 to a discarding (blocking) state as shown in FIG. 1B. Then, bridges 101a and 102 implement the spanning tree algorithm and protocol to make sure they do not have any data loops above the propagation line labeled 108a. As can be seen, there are no data loops above the propagation line labeled 108a.

Figure 1C:
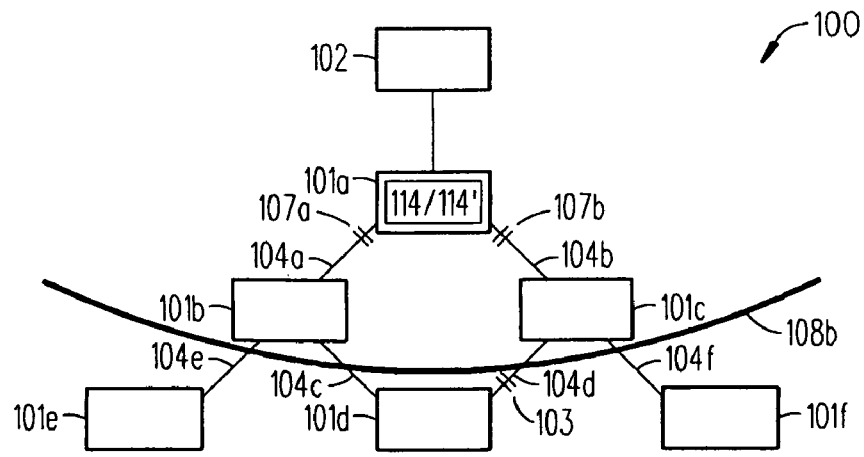

The bridge 101a sets its downstream ports 107a and 107b to a discarding (blocking) state as shown in FIG. 1C and then the "cut" is propagated to downstream bridges 101b and 10c. The bridges 101b and 10c then implement the spanning tree algorithm to make sure there are no data loops above the propagation line labeled 108b. As can be seen, there are no data-loops above the propagation line labeled 108b.

Figure 1D:
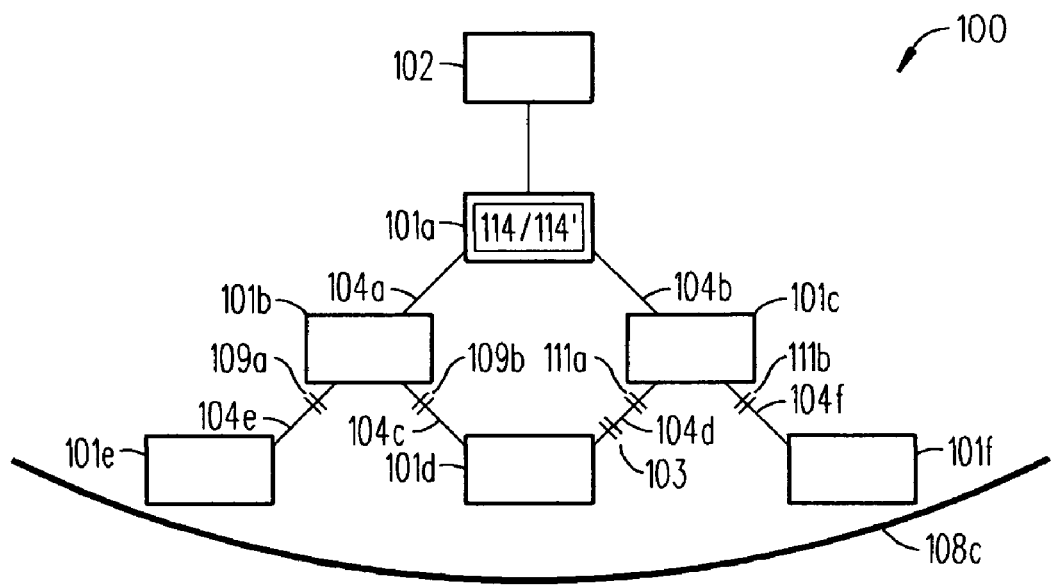
Figure 1E:
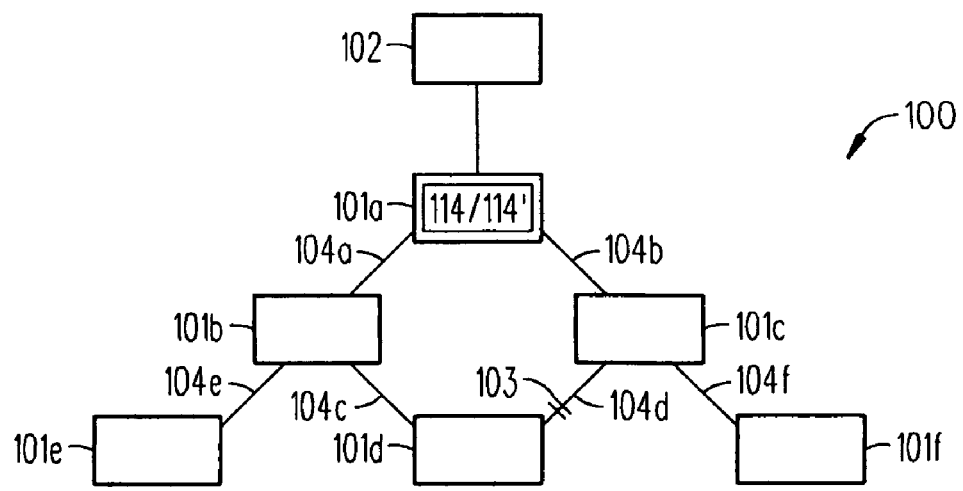

Finally, bridges 101b and 101c set their downstream ports 109a/109b and 111a/111b to a discarding (blocking) state and then the "cut" is propagated to downstream bridges 101d, 101e and 101f which happen to be the leaves of the spanning tree as shown in FIG. 1D. The bridges 101d, 101e and 101f then implement the spanning tree algorithm to make sure there are no data loops above the propagation line labeled 108c. As can be seen, there was a data loop and to address that the port 103 on bridge 101d was set to a discarding (blocking) state. FIG. 1E shows the bridged network 100 including the new bridge 102 and the old bridges 101a, 101b . . . 101f after the propagation of the "cut".

As can be seen, the "cut" requires that some ports of a bridge transit to the discarding state, where they block data traffic, thus preventing the formation of data loops behind such ports. To ensure that data loops are not created in between this bridge and its downstream bridges, and between these downstream bridges and their downstream bridges, the "cut" is propagated on a spanning tree through the bridges until it reaches the leaves of the spanning tree. It should be appreciated that the "cut" would also be initiated if an old bridge was removed from the bridge network 100.

Figure 3:
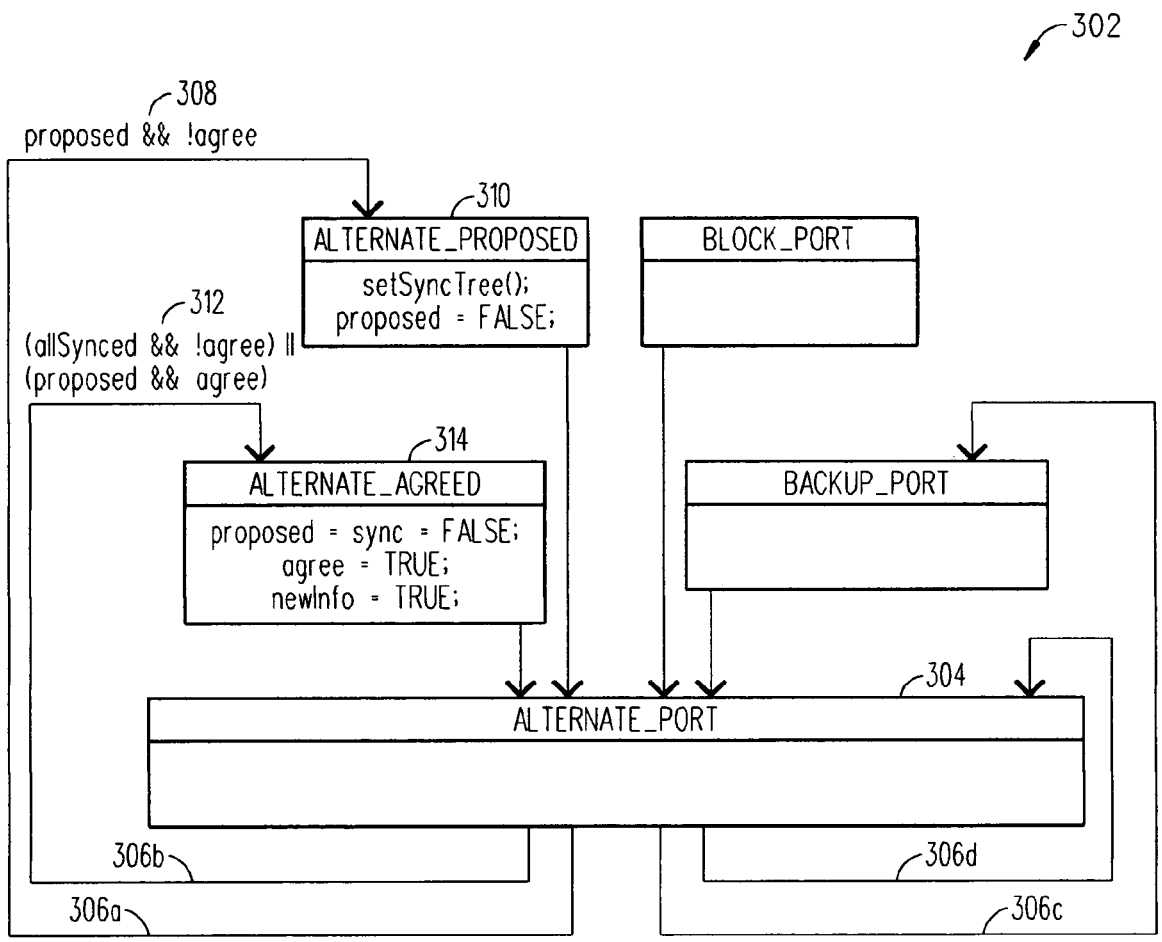
FIG. 3 (PRIOR ART) is a block diagram that illustrates the traditional alternate and backup port role transitions (specified in IEEE Std 802.1D-2004 and IEEE Std 802.1Q-2005) which are implemented within a PRT state machine of a bridge.
Figure 4:
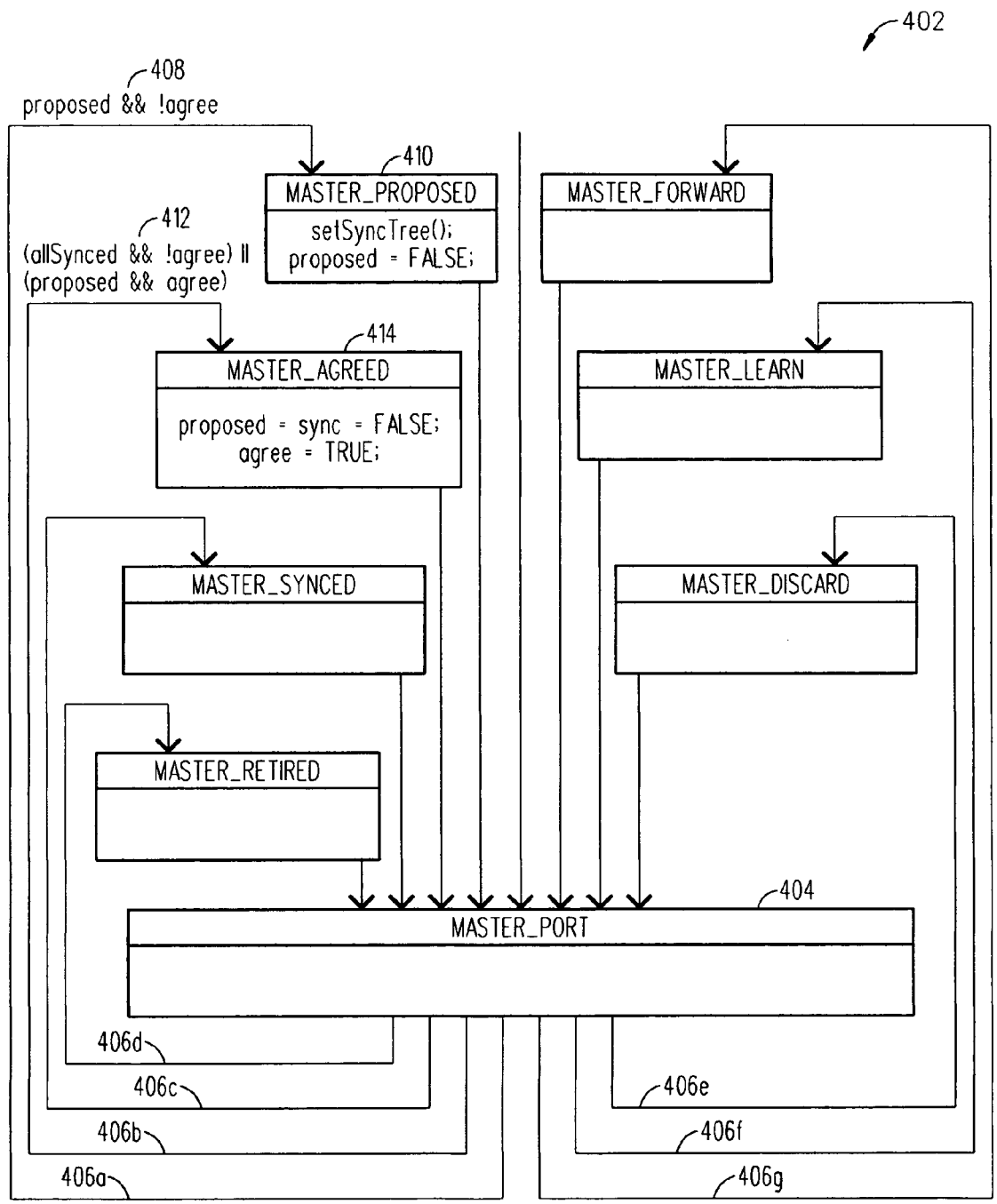
FIG. 4 (PRIOR ART) is a block diagram that illustrates the traditional master port role transitions (specified in IEEE Std 802.1Q-2005) which are implemented within a PRT state machine of a bridge.

To properly implement the "cut", the bridges 101a, 101b . . . 101f and 102 need to have their respective port role transitions (PRT) state machines 114 enter and execute various states in a specific sequence. However, the existing RSTP and MSTP specifications do not explicitly require such a sequence and even expect that these states can be enterable and executable in any order which is problematical. This problem is discussed in detail below with respect to three different port role transitions which are implemented within the PRT state machine 114 as shown in FIGS. 2-4 (PRIOR ART).

Figure 2:
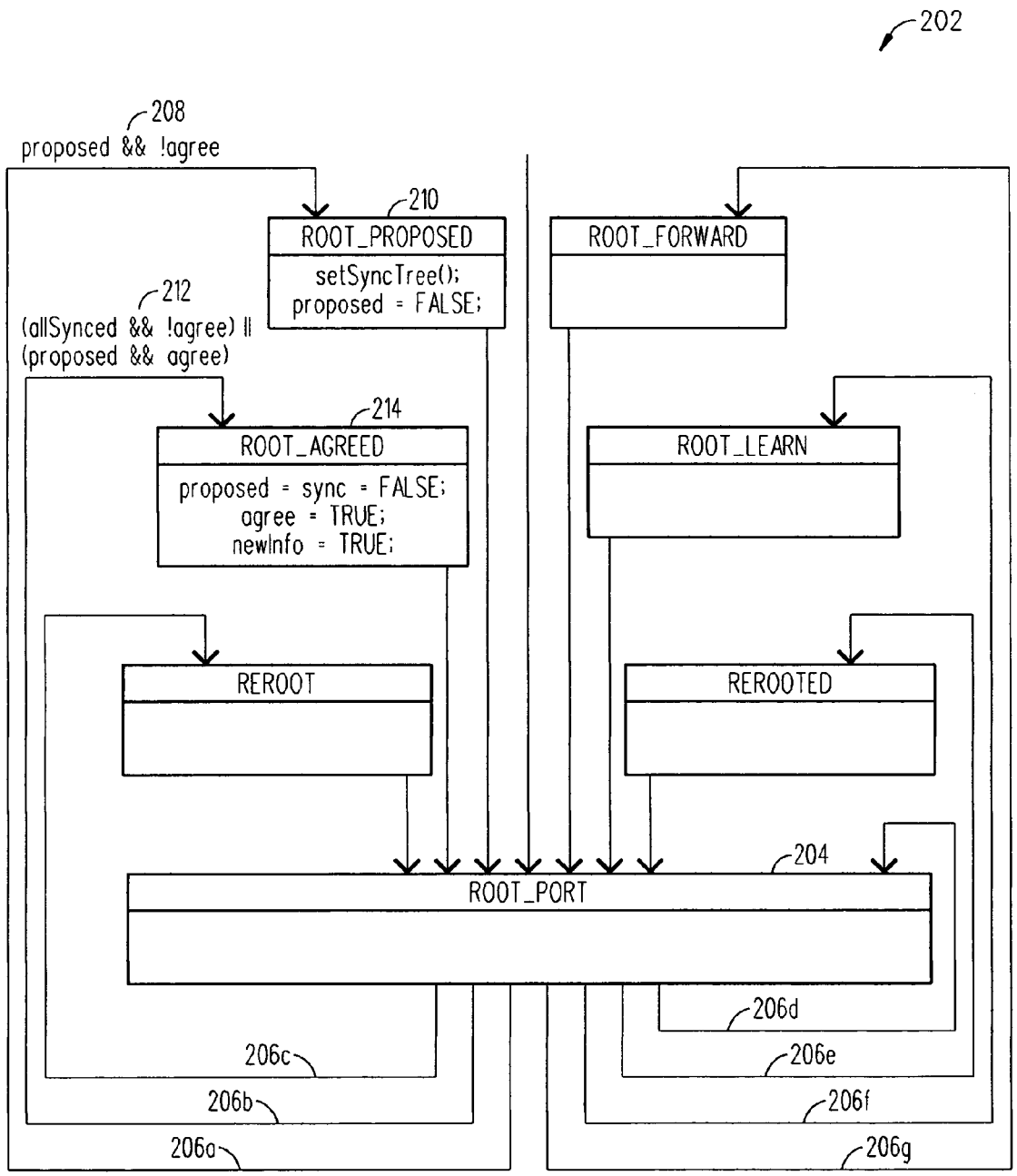

Referring to FIG. 2 (PRIOR ART), there is a diagram illustrating the relevant parts of the traditional root port role transitions 202 which are implemented within the PRT state machine 114 in accordance with the RSTP specified in IEEE Std 802.1D-2004. As shown, the traditional root port role transitions 202 have a ROOT_PORT state 204 with multiple transitions 206a, 206b . . . 206g of which transitions 206a and 206b are relevant to the present discussion. The first transition 206a has a condition 208 shown as (proposed && !agree) which, if it has a boolean value of TRUE, enables the ROOT_PROPOSED state 210 to be entered. And, if the condition 208 shown as (proposed && !agree) has a boolean value of FALSE then the ROOT_PROPOSED state 210 can not be entered. The second transition 206b has a condition 212 shown as (allSynced && !agree) || (proposed && agree) which, if it has a boolean value of TRUE, enables the ROOT_AGREED state 214 to be entered. And, if the condition 212 shown as (allsynced && !agree) || (proposed && agree) has a boolean value of FALSE then the ROOT_AGREED state 214 can not be entered. The conditions 208 and 212 have symbols which are defined in IEEE Std 802.1D-2004 as follows:

! represents a logical NOT operator.
&& represents a logical AND operator.
|| represents a logical OR operator.

As indicated above, the traditional root port role transitions 202 are not the only port role transitions implemented within the PRT state machine 114 which is relevant to this discussion. The PRT state machine 114 also implements the traditional alternate and backup port role transitions 302 which are shown in FIG. 3 (PRIOR ART). As shown, the traditional alternate and backup port role transitions 302 have an ALTERNATE_PORT state 304 with multiple transitions 306a, 306b . . . 306d of which transitions 306a and 306b are relevant to the present discussion. The first transition 306a has a condition 308 shown as (proposed && !agree) which, if it has a boolean value of TRUE, enables the ALTERNATE_PROPOSED state 310 to be entered. And, the second transition 306b has a condition 312 shown as (allSynced && !agree) || (proposed && agree) which, if it has a boolean value of TRUE, enables the ALTERNATE_AGREED state 314 to be entered. The traditional alternate and backup port role transitions 302 shown are configured in accordance with the RSTP specified in IEEE Std 802.1D-2004. As can be seen, the alternate and backup port role transitions 302 have similar conditions 308 and 312 and states 310 and 314 as the ones associated with the root port role transitions 202 (compare FIGS. 2 and 3).

Alternatively, the PRT state machine 114 may be configured in accordance with the MSTP specified in IEEE Std 802.1Q-2005. In this case, the PRT state machine 114 would have root port role transitions which are similar to the RSTP root port role transitions 202. In addition, the PRT state machine 114 would have alternate and backup port role transitions which are similar to the RSTP alternate and backup port role transitions 302. Moreover, the PRT state machine 114 would have master port role transitions 402 which are used when MSTP is implemented but are not used when RSTP is implemented. The master port role transitions 402 (specified in IEEE Std. 802.1Q-2005) are described next with respect to FIG. 4 (PRIOR ART). As shown in FIG. 4 (PRIOR ART), the master port role transitions 402 have a MASTER_PORT 404 with multiple transitions 406a, 406b . . . 406g of which transitions 406a and 406b are relevant to the present discussion. The first transition 406a has a condition 408 shown as (proposed && !agree) which, if it has a boolean value of TRUE, enables the MASTER_PROPOSED state 410 to be entered. And, the second transition 406b has a condition 412 shown as (allSynced && !agree) || (proposed && agree) which, if it has a boolean value of TRUE, enables the MASTER_AGREED state 414 to be entered. As can be seen, the master port role transitions 402 have similar conditions 408 and 412 and states 410 and 414 as the ones associated with the root port role transitions 202 and the alternate and backup port role transitions 302 (compare FIGS. 2-4). Each of these traditional transitions 202, 302 and 402 and in particular their conditions 212, 312 and 412 are problematical when it comes to enabling the proper propagation of a "cut" as is discussed next.

To properly propagate the "cut", it is well known that the X_PROPOSED state 210, 310 and 410 needs to be entered and executed before the X_AGREED state 214, 314 and 414 where X represents "ROOT", "ALTERNATE" and "MASTER". However, the existing RSTP and MSTP standards do not explicitly require such a sequence and even expect that the X_PROPOSED state 210, 310 and 410 and the X_AGREED state 214, 314 and 414 could be enterable and executable in an arbitrary order. For instance, the RSTP specified in IEEE Std 802.1D-2004 states the following in section 17.16 "[w]here two or more exit conditions with the same level of precedence become TRUE simultaneously, the choice as to which exit condition causes the state transition to take place is arbitrary". This is problematical.

The traditional solution is not good because it is not deterministic. For instance, simulations have exhibited the fact that the following variables can at. the same time be set as follows:

agree=FALSE;
proposed=TRUE; and
allSynced=TRUE.

In this situation, anyone of two possible scenarios can occur: (1) the X_PROPOSED state 210, 310 and 410 can be entered and executed before the X_AGREED state 214, 314 and 414 (which is correct); or (2) the X_AGREED state 214, 314 and 414 can be entered and executed before the X_PROPOSED state 210, 310 and 410 (which is not correct). Either one of these scenarios can occur because the first condition 208, 308 and 408 and the second condition 212, 312 and 412 each can have a boolean value of TRUE at the same time. How each of these scenarios can arbitrarily occur is discussed in detail next.

In the first scenario, the first condition 208, 308 and 408 represented as (proposed && !agree) can be satisfied first because the variable "proposed" is TRUE and the variable "agree" is FALSE. If this happens, then the X_PROPOSED state 210, 310 and 410 is entered and the following occurs:

The setSyncTree( ) procedure is executed, which is the first step in the propagation of the "cut" on this particular bridge 102a (or bridge 102b . . . 102f). Again, the first step in the propagation of the "cut" is where the downstream port(s) of that particular bridge 102a (or bridge 102b . . . 102f) is set to be in a discarding (blocking) state (see FIG. 1A-1E).

The variable "proposed" is reset to the boolean value FALSE, and the X_PROPOSED state 210, 310 and 410 can no longer be entered.

The X_AGREED state 214, 314 and 414 can then be entered and executed because the variable "allSynced" is TRUE and the variable "agree" is FALSE for the first part (allSynced && !agree) of the second condition 212, 312 and 412. At this point, the variables "proposed" and "sync" are set to FALSE, and the variables "agree" and "newInfo" are set to TRUE (the MASER_AGREED state 414 does not set the variable "newInfo" to TRUE). This enables the final step in the propagation of the "cut" to be performed on this particular bridge 102a (or bridge 102b . . . 102f). During, the final step of the propagation of the "cut" the downstream bridges are informed that they should perform the first and second steps of the propagation of the "cut" if deemed necessary by their executing the spanning tree algorithm.

In the second scenario, the second condition 212, 312 and 412 represented as (allsynced && !agree) || (proposed && agree) is satisfied first because the variable "allsynced" is TRUE and the variable "agree" is FALSE. If this happens, then the X_AGREED state 214, 314 and 414 is entered and the following occurs:

The variable "proposed" is reset to the boolean value of FALSE, and the X_PROPOSED state 210, 310 and 410 can no longer be entered. This prevents the first step in the propagation of the "cut" on this particular bridge 102a (or bridge 102b . . . 102f) from being taken, which can have undesirable consequences.

In the event, the X_AGREED state 214, 314 and 414 happened to be entered first then data loops could be created which are not desired in the bridged network 100. Because, if data loops are created then this could result in frames (e.g., Ethernet frames) that not only loop but proliferate within the bridged network 100. And, this can lead to a severe loss of available bandwidth in the bridged network 100 such that the bridged network 100 can no longer serve its purpose. Accordingly, there is a need for a solution that can ensure that the X_PROPOSED state 210, 310 and 410 is always entered and executed before the X_AGREED state 214, 314 and 414. This need is satisfied by a PRT state machine 114' that is configured in accordance with the present invention.

Figure 5:
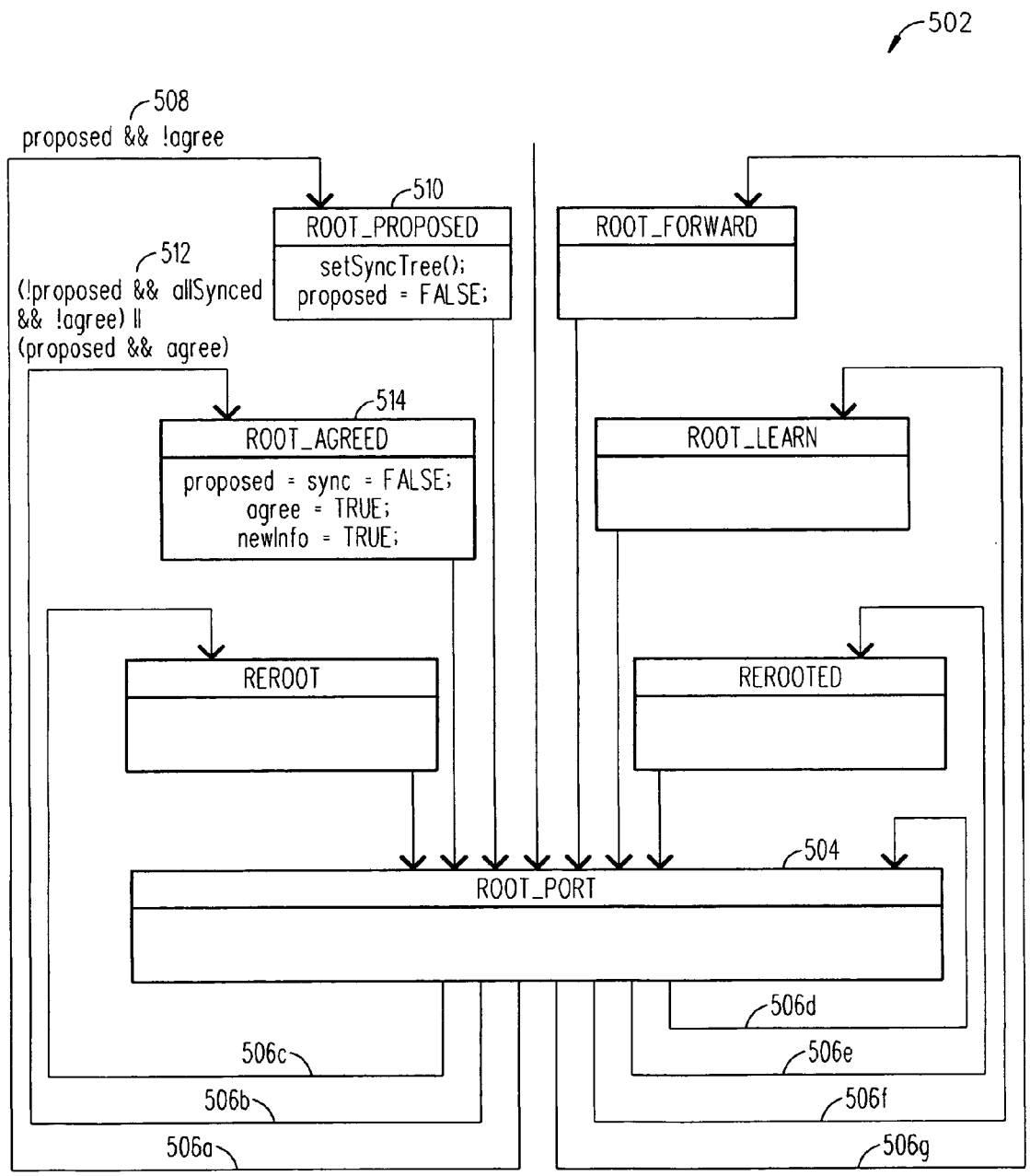
FIG. 5 is a block diagram that illustrates the new root port role transitions which are implemented within a PRT state machine of a bridge in accordance with the present invention.
Figure 6:
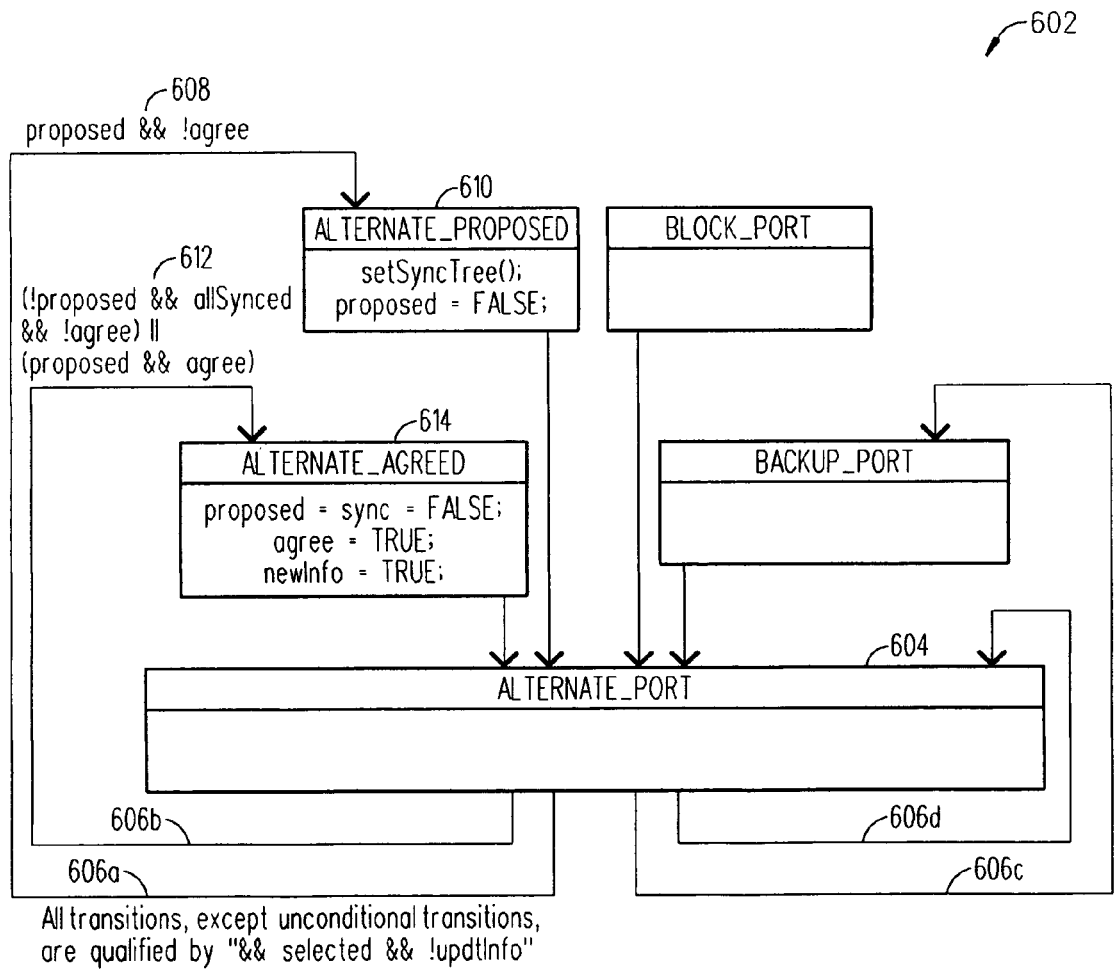
FIG. 6 is a block diagram that illustrates the new alternate and backup port role transitions which are implemented within a PRT state machine of a bridge in accordance with the present invention.
Figure 7:
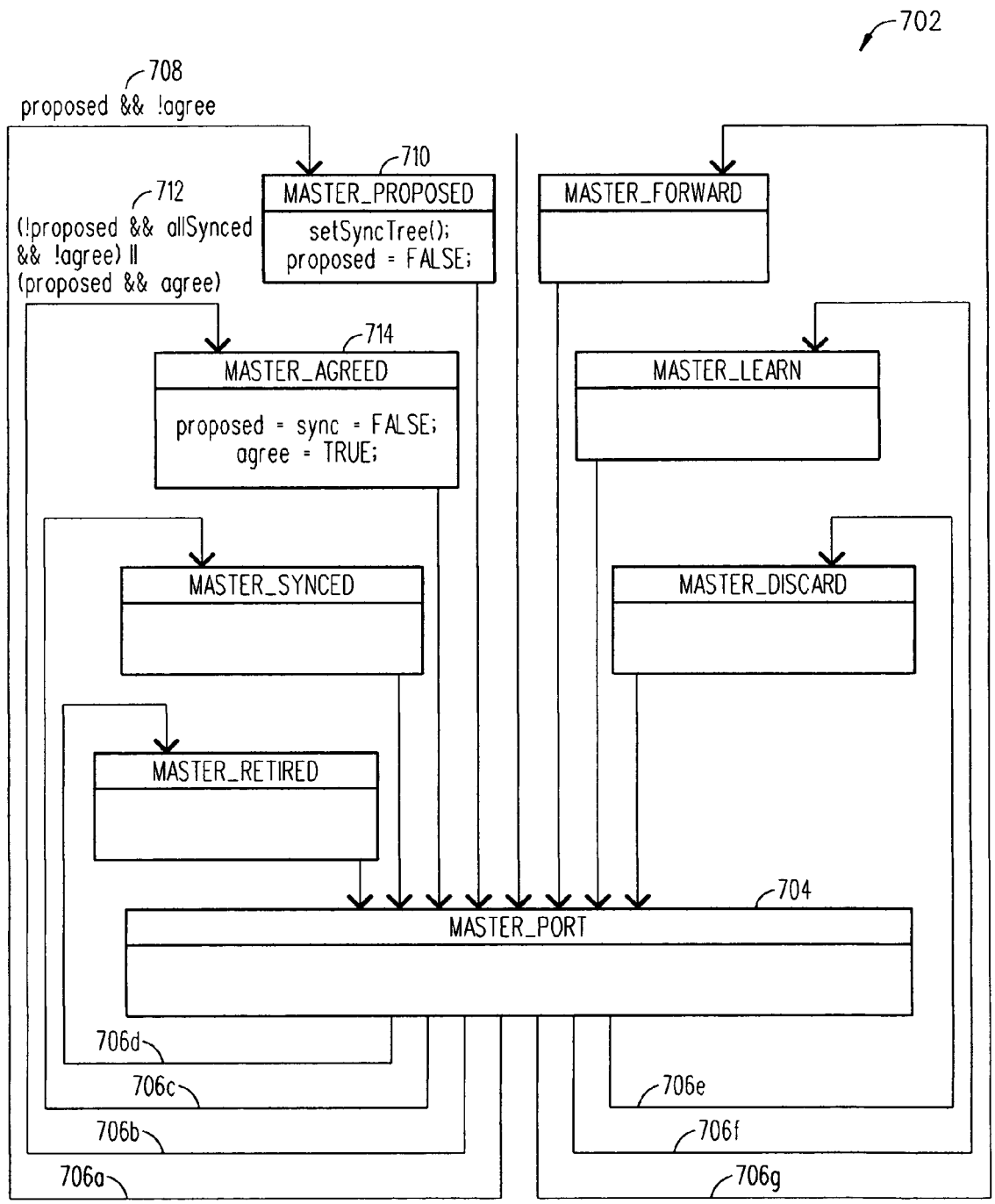
FIG. 7 is a block diagram that illustrates the new master port role transitions which are implemented within a PRT state machine of a bridge in accordance with the present invention.

The present invention addresses the problem with the traditional PRT state machine 114 by modifying the second conditions 212, 312 and 412 where variables are inserted whose placement and evaluation at execution time ensure that the X_PROPOSED state 210, 310 and 410 and the X_AGREED state 214, 314 and 414 are entered and executed in the correct sequence. Basically, the present solution involves the changing of the second condition 212, 312 and 412 from (allSynced && !agree) || (proposed && agree) to (!proposed && allSynced && !agree) || (proposed && agree). This change can be seen in FIGS. 5-7 which illustrate the new root port role transitions 502 (e.g., enhancement to IEEE Std 802.1D-2004 and IEEE Std 802.1Q-2005), the new alternate and backup port role transitions 602 (e.g., enhancement to IEEE Std 802.1D-2004 and IEEE Std 802.1Q-2005) and the new master port role transitions 702 (e.g., enhancement to IEEE Std 802.1Q-2005), respectively. As can be seen, the new root port role transitions 502, the new alternate and backup port role transitions 602 and the new master port role transitions 702 have X_PROPOSED states 510, 610 and 710, X_AGREED states 514, 614 and 714, and first conditions 508, 608 and 708 which are the same as those shown in FIGS. 2-4.

The new PRT state machine 114' is configured such that the X_PROPOSED state 510, 610 and 710 needs to be entered and executed before the X_AGREED state 514, 614 and 714. To test the new solution, the aforementioned example is used again where the variables are set as follows:
agree=FALSE;
proposed=TRUE; and
allsynced=TRUE.

In this situation, there is just one possible scenario that can occur and that is where the X_PROPOSED state 510, 610 and 710 is always entered and executed before the X_AGREED state 514, 614 and 714. It is no longer possible to have a scenario where the X_AGREED state 514, 614 and 714 can be entered and executed before the X_PROPOSED state 510, 610 and 710. This happens because the first condition 508, 608 and 708 represented as (proposed && !agree) will always be satisfied first because the variable "proposed" is TRUE and the variable "agree" is FALSE. The second condition 512, 612 and 712 represented as (!proposed && allSynced && !agree) || (proposed && agree) will not be satisfied first because of the addition of the new condition "!proposed". The new condition "!proposed" can not be evaluated to TRUE in this scenario because the logical negation of the variable "proposed" is FALSE. As a result, the X_PROPOSED state 510, 610 and 710 is always entered first and the following occurs:

The setSyncTree( ) procedure is executed, which is the first step in the propagation of the "cut" on this particular bridge 102a (or bridge 102b . . . 102f). Again, the first step in the propagation of the "cut" is where the downstream port(s) of that particular bridge 102a (or bridge 102b . . . 102f) is set to be in a discarding (blocking) state (see FIG. 1A-1E).

The variable "proposed" is reset to the boolean value FALSE, and the X_PROPOSED state 510, 610 and 710 can no longer be entered.

The X_AGREED state 514, 614 and 714 can then be entered and executed because the variable "proposed" is FALSE, the variable "allSynced" is TRUE and the variable "agree" is FALSE for the first part (!proposed && allSynced && !agree) of the second condition 512, 612 and 712. At this point, the variables "proposed" and "sync" are set to FALSE, and the variables "agree" and "newInfo" are set to TRUE (the MASER_AGREED state 714 does not set the variable "newInfo" to TRUE). This enables the final step in the propagation of the "cut" to be performed on this particular bridge 102a (or bridge 102b . . . 102f). During, the final step of the propagation of the "cut" the downstream bridges are informed that they should perform the first and second steps of the propagation of the "cut" if deemed necessary by their executing the spanning tree algorithm.

It should be appreciated that all of the conditions 206a . . . 206g, 208, 212, 306a . . . 306d, 308, 312, 406a . . . 406g, 408, 412, 506a . . . 506g, 508, 512, 606a . . . 606d, 608, 612, 706a . . . 706g, 708 and 712 are typically implicitly completed/post fixed with "&& selected && !updtinfo" where the "selected" and "updtinfo" are two variables.

Following are some additional features and advantages of the present solution:

The present solution places the burden of proper sequencing not on the implementer but on the state machines. This eliminates a potential cause for human error.

The present solution is easy to implement and is deterministic.

The present solution applies both to sequential and non-sequential implementations.

The present solution helps eliminate the risk of creating data loops in the bridged network 100. This is critical to proper operation of the bridged network 100.

Although one embodiment of the present invention has been illustrated in the accompanying Drawings and described in the foregoing Detailed Description, it should be understood that the present invention is not limited to the embodiment disclosed, but is capable of numerous rearrangements, modifications and substitutions without departing from the spirit of the invention as set forth and defined by the following claims.

What is claimed is:

1. A device comprising:
a port role transitions state machine configured according to a first condition to transit to an X_PROPOSED state and further configured according to a second condition to transit to an X_AGREED state, wherein the device is configured such that said first condition and said second condition are both defined to ensure that the X_PROPOSED state is entered before the X_AGREED state.

2. The device of claim 1, wherein said first condition is defined as:
(proposed && !agree) where:
proposed is a variable;
agree is a variable;
! represents a logical NOT operator; and
&& represents a logical AND operator.

3. The device of claim 1, wherein said second condition is defined as:
(!proposed && allsynced && !agree) || (proposed && agree) where:
proposed is a variable;
agree is a variable;
allSynced is a parameter;
! represents a logical NOT operator;
&& represents a logical AND operator; and
|| represents a logical OR operator.

4. The device of claim 1, wherein said X_PROPOSED state and said X_AGREED state include:
a ROOT_PROPOSED state and a ROOT_AGREED state;
an ALTERNATE_PROPOSED state and an ALTERNATE_AGREED state; or
a MASTER_PROPOSED state and a MASTER_AGREED state.

5. The device of claim 1, wherein said port role transitions state machine is associated with a spanning tree protocol.

6. The device of claim 5, wherein said spanning tree protocol is based on a rapid spanning tree protocol (RSTP).

7. The device of claim 5, wherein said spanning tree protocol is based on a multiple spanning tree protocol (MSTP).

8. The device of claim 1 wherein the device is a bridge.

9. A method for ensuring a proper propagation of a cut within a bridged network, said method comprising the steps of:
for each bridge within said bridged network,
entering an X_PROPOSED state upon satisfying a first condition to transit into said X_PROPOSED state; and
entering an X_AGREED state upon satisfying a second condition to transit into said X_AGREED state, wherein said first condition and said second condition are both defined to ensure that the X_PROPOSED state is entered before the X_AGREED state.

10. The method of claim 9, wherein said first condition is defined as:
(proposed && !agree); and
said second condition is defined as:
(!proposed && allSynced && !agree) || (proposed && agree) where:
proposed is a variable;
agree is a variable;
allSynced is a parameter;
! represents a logical NOT operator;
&& represents a logical AND operator; and
|| represents a logical OR operator.

11. The method of claim 10, wherein upon entering said X_PROPOSED state the method further comprises:
executing a setSyncTree()procedure; and
setting the variable "proposed" to FALSE.

12. The method of claim 10, wherein upon entering said X_AGREED state the method further comprises:
setting the variable "proposed" and a variable "sync" to FALSE;
setting the variable "agree" to TRUE; and
optionally setting a variable "newInfo" to TRUE.

13. The method of claim 9, wherein said X_PROPOSED state and said X_AGREED state includes:
a ROOT_PROPOSED state and a ROOT_AGREED state;
an ALTERNATE_PROPOSED state and an ALTERNATE_AGREED state; or
a MASTER_PROPOSED state and a MASTER_AGREED state.

14. The method of claim 9, wherein each bridge is further configured to implement a spanning tree protocol.

15. The method of claim 14, wherein said spanning tree protocol is based on a rapid spanning tree protocol (RSTP).

16. The method of claim 14, wherein said spanning tree protocol is based on MSTP.

17. A network comprising:
a plurality of bridges which are coupled to one another by links, each bridge configured to ensure propagation of a cut by:
entering an X_PROPOSED state upon satisfying a first condition to transit into said X_PROPOSED state; and
entering an X_AGREED state upon satisfying a second condition to transit into said X_AGREED state, wherein said first condition and said second condition are both defined to ensure that the X_PROPOSED state is entered before the X_AGREED state.

18. The network of claim 17, wherein said first condition is defined as:
(proposed && !agree); and
said second condition is defined as:
(!proposed && allsynced && !agree) || (proposed && agree) where:
proposed is a variable;
agree is a variable;
allsynced is a parameter;
! represents a logical NOT operator;
&& represents a logical AND operator; and
|| represents a logical OR operator.

19. The network of claim 18, wherein each bridge, upon entering said X_PROPOSED state, is further configured to:
execute a setSyncTree()procedure; and
set the variable "proposed" to FALSE.

20. The network of claim 18, wherein each bridge, upon entering said X_AGREED state, is further configured to:
set the variable "proposed" and a variable "sync" to FALSE;
set the variable "agree" to TRUE; and
optionally set a variable "newInfo" to TRUE.

21. The network of claim 17, wherein said X_PROPOSED state and said X_AGREED state includes:
a ROOT_PROPOSED state and a ROOT_AGREED state;
an ALTERNATE_PROPOSED state and an ALTERNATE_AGREED state; or
a MASTER_PROPOSED state and a MASTER_AGREED state.

22. The network of claim 17, wherein each bridge is further configured to implement a spanning tree protocol.

23. The network of claim 17, wherein said spanning tree protocol is based on a rapid spanning tree protocol (RSTP).

24. The network of claim 17, wherein said spanning tree protocol is based on MSTP.

* * * * *